April 5, 1938. N. JANCO 2,113,376

HIGH SPEED ENGINE INDICATOR

Filed Aug. 29, 1936

Inventor
Nathan Janco,
By
Attorney

Patented Apr. 5, 1938

2,113,376

UNITED STATES PATENT OFFICE 2,113,376

HIGH SPEED ENGINE INDICATOR

Nathan Janco, Houston, Tex.

Application August 29, 1936, Serial No. 98,595

7 Claims. (Cl. 73—185)

My invention relates to an apparatus for and and a method of indicating the variations of pressure within a cylinder of an engine or the like. More particularly, my invention is an electrical method for indicating on a cathode ray oscillograph the pressure within a cylinder of an internal combustion engine as a function of piston position, volume, time, or the like.

I am aware that numerous methods have been employed for the indication of pressures within cylinders of internal combustion engines. Methods which involve mechanical movements are generally handicapped by inertia, or natural periods of vibration of the measuring apparatus. Several of the proposed electrical methods have been successful but have not been independent of the frequency of the variations in pressure. The present invention avoids several of the handicaps of the prior devices by converting the variations in pressure into variations in current. The current variations are impressed on a high frequency carrier current which is rectified, filtered, amplified if desired, and impressed on one set of deflecting electrodes of a cathode ray oscillograph. The other operating function, variation of time, cylinder volume, or the like, is also converted into electrical potentials which are impressed on a second set of deflecting electrodes of the oscillograph. Thus the two functions may be employed to deflect the cathode ray along a vertical axis and a horizontal axis of the oscillograph screen.

One object of my invention is to provide means for converting variations of pressure within a cylinder of an engine into variations of current.

Another object is to provide means whereby a high frequency current can be modulated by variations of current corresponding to variations of pressure within a cylinder.

A further object is to provide means for deflecting a cathode ray by potential variations which correspond to pressure variations and by potential variations corresponding to another variable function of an internal combustion engine.

An additional object is to provide means for modulating a carrier current by variations corresponding to pressure variations within a cylinder, detecting the modulated carrier, and deflecting the cathode ray of an oscillograph on one axis in accordance with the detected currents and simultaneously deflecting said ray along another axis as a function of time, volume of the cylinder, piston position or the like.

Figure 1:
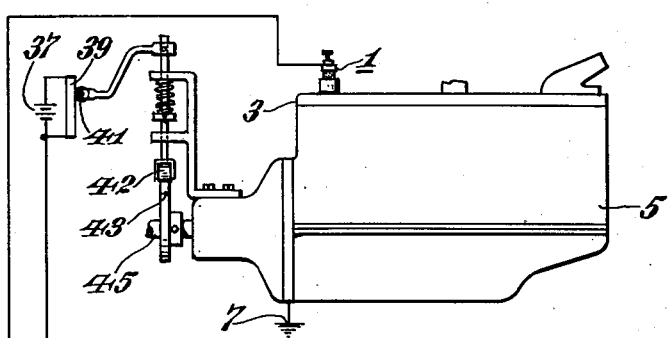
Figure 2:
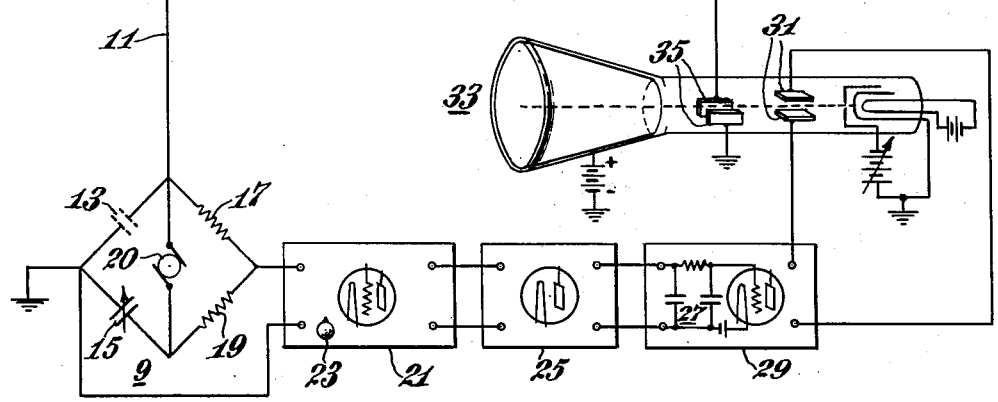
Figure 2:
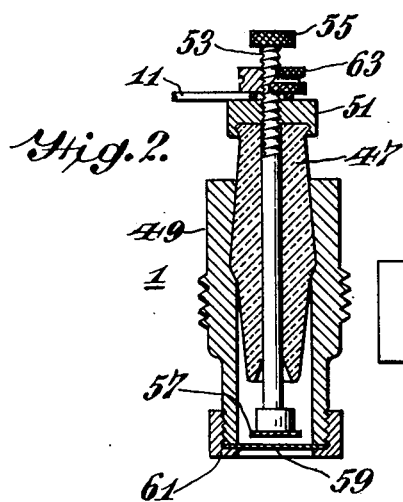
Figure 4:
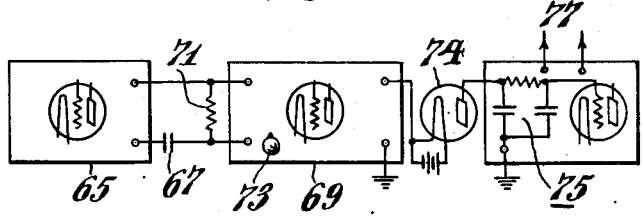
Figure 3:
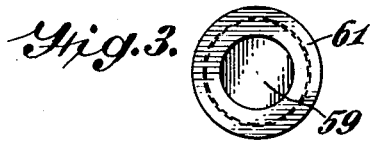

My invention may be best understood by reference to the accompanying drawing, in which Fig. 1 is a schematic diagram of one embodiment of my invention, Figs. 2 and 3 are sectional and elevational views illustrating a capacity element which is inserted in the cylinder under observation, and Fig. 4 is a schematic diagram of a modified circuit arrangement.

Referring to Fig. 1, a capacity element 1, which will be described below, is screwed into the cylinder head 3 of an internal combustion motor 5. The motor is suitably grounded at 7. The capacity element is connected to the Wheatstone bridge 9 by a lead 11. The capacity of the element 1 is represented by reference numeral 13. The other capacity arm of the bridge is a variable capacitor 15. The resistive arms of the bridge 9 are resistors 17—19. The bridge 9 is energized by an alternating current source 20. The alternating current may be generated by a thermionic oscillator, alternator, or the like, having a frequency of the order of 5,000 cycles per second.

The output of the bridge 9 is impressed on an amplifier 21, which preferably has a uniform gain of the order of two thousand over a frequency range of the order of 20 cycles to 12,000 cycles. A suitable control 23 may be used to regulate the amplifier gain. The output circuit of the amplifier is connected to a rectifier 25. The rectifier 25 is connected through a filter network 27 to a low frequency amplifier 29. The output circuit of the low frequency amplifier 29 is connected to the pair of vertical deflecting electrodes 31 of a cathode ray oscillograph 33. The cathode ray oscillograph is energized in the conventional manner.

The other pair of deflecting electrodes 35 of the cathode ray oscillograph are energized by varying potentials derived from a source of current, such as a battery 37. One terminal of the battery 37 is connected to the lower end of a potentiometer 39. The other terminal of the battery 39 is connected to the upper end of the potentiometer. The slider 41 of the potentiometer is grounded and coupled to a cam follower 42 which is operated by a cam 43 attached to the engine shaft. The slider 41 will move over the potentiometer varying the voltage applied to the deflecting electrodes 35 in synchronism with the piston movement in the cylinder under observation.

The cam may be shaped to move the slider 41 in accordance with any desired rate to establish potential variations which follow any desired function of time, cylinder position, volumetric displacement, or the like. The deflecting voltages may also be derived from suitable electromechanical connections to the engine shaft, crank shaft, piston, or distributor. Likewise the deflecting voltages may be generated electromagnetically. By way of example, an alternator or generator may be coupled to the shaft 45 and thus generate the voltages for the horizontal deflections of the cathode ray.

One suitable form of capacity element 1 is illustrated in Figs. 2 and 3. An insulator 47 is suitably fastened within a threaded casing 49. A metal cap 51, secured to the insulator 47, is threaded to receive an adjusting screw 53. One end of the adjusting screw is terminated in a knurled knob 55. The other end of the screw is terminated in an armature 57. This armature 57 is adjustably disposed adjacent a thin diaphragm 59. The diaphragm is preferably made of high temperature resistant steel alloy of the order of 0.015 inch thick for ordinary internal combustion engines. The diaphragm is firmly clamped between the casing 49 and an open ended clamping nut 61. A lock nut 63 secures the adjusting screw and forms a terminal connection. The capacity which varies is formed by the spaced armature 57 and the diaphragm 59.

Having described the essential elements and circuits, I shall now describe the method of operating the indicator. The capacity element 1 is screwed into a threaded hole in the head 3 of the cylinder under observation. The adjusting screw is regulated until the armature 57 is just spaced from the diaphragm, which will be moving under the influence of the forces within the cylinder. The movement of the diaphragm will be proportional to the change in pressure within the cylinder. The capacity between the armature and the diaphragm will be inversely proportional to the spacing between them. Thus the capacity of the element 1 varies as the pressure varies.

The capacity element 1 is one of the arms of the Wheatstone bridge which is first balanced for a steady state in which no pressure is exerted on the element 1. Since the bridge is balanced the output currents are zero and there are no varying currents applied to move the cathode ray. If the engine 5 is operated, the capacity of element 1 will vary proportionally to the changes in pressure. The variations in capacity unbalance the bridge, and thus impress modulation currents on the high frequency currents. That is, the unbalancing of the bridge modulates the output currents which are amplified by amplifier 21, and detected by the rectifier 25. The rectified currents are filtered to remove all trace of the high frequency current. The filtered currents may be further amplified, if higher voltages are desired, by a low frequency amplifier 29. The output of the filter (or low frequency amplifier if one is used) is impressed on the deflecting electrodes 31, thereby vertically deflecting the cathode ray.

In synchronism with the application of voltage to the vertical deflecting electrodes 31, voltages are applied to the horizontal deflecting electrodes 35. Thus the cathode ray is deflected vertically by voltages which are proportional to the pressures, and horizontally by voltages which are proportional to some other function of the cylinder under observation; as, for example, the piston position. One substantial advantage of the foregoing method is that the engine may be operated over a wide range of speeds without distortion of the deflecting potentials due to their frequency. Another advantage is found in the entire absence of inertia.

A modification of the circuit of Fig. 1 is shown in Fig. 4. In the latter figure, a high frequency current source is represented by the thermionic oscillator 65, which is connected through the capacity 67 (corresponding to the capacity of the capacity element 1) to a direct current amplifier 69. A resistor 71 is shunted across the input terminals of the d-c amplifier 69. The gain control 73 of this amplifier is preferably of the grid bias type. The amplifier output circuit is connected to a rectifier 74 and hence to a filter 75 which is resonant to the high frequency currents. The output 77 from the filter may be amplified by a low frequency amplifier or impressed on the deflecting electrodes of a cathode ray tube in accordance with the circuit arrangement previously disclosed in Fig. 1.

For maximum sensitivity the resistance of the resistor 71 should be of the order of the reactance of the capacitor 67 at the frequency used. By way of example, the resistance of the resistor may be about two megohms. In this circuit arrangement the cathode ray deflections will be proportional to the pressure in the engine cylinder. If a conventional a-c amplifier is substituted for the d-c amplifier 69, the deflections will be proportional to the rate of change of pressure in the cylinder. The adjustments of the apparatus of Fig. 4 are somewhat easier to make than the bridge circuit.

Thus an engine indicator has been described in which variations of pressure within a cylinder of an engine are converted into variations of current which modulate or are superimposed on a high frequency current. The modulated high frequency current is rectified to produce low frequency currents which vary as the pressure variation within the cylinder. High frequency current components are removed from the low frequency currents which are impressed on the deflecting electrodes of a cathode ray oscillograph. A current is established which preferably varies as some function of the engine operation, for example, piston position, and this current is applied to a second set of deflecting electrodes. The cathode ray is thus deflected along one axis by currents corresponding to pressure variations and along another axis by currents corresponding to some other function of the engine operation. While I prefer to observe the variations of pressure as a function of some other variable, it should be understood that the cathode ray will be deflected by a single variable current along a single axis.

While I have illustrated my invention with specific mechanisms and values, I do not intend to thereby limit its application. For example, the high frequency currents may have any desired rate of oscillation. The pressure variations may vary the resistance or reactance of any suitable element. The filter connected to the rectifier output and the low frequency amplifier are optional as the device may be used without these elements. The oscillograph may be of the Duddell or string type instead of the cathode ray. The indicator diagrams may be photographed. Stray capacity effects may be eliminated by shielding, balancing or the like. Other modifications will occur to those skilled in the art. Such modifications are within the spirit of my invention which is only limited by the foregoing specification and appended claims.

I claim as my invention:

1. An indicator for observing pressure variations of pressure varying means comprising means responsive to said pressure variations to thereby establish variations of capacity, a bridge including said capacity, means for impressing a high frequency current on said bridge, means for amplifying the output currents of said bridge, means for rectifying said amplified output currents, means for filtering component currents of said high frequency from said rectified currents, a cathode ray oscillograph including two pairs of deflecting electrodes, means for impressing said filtered rectified currents on one of said pairs of electrodes, means for establishing a source of potential which varies as a function of the pressure varying means, and means for impressing said last potential variations on the other of said pair of deflecting electrodes.

2. In a device of the character of claim 1 a direct current amplifier for amplifying said high frequency currents.

3. A pressure indicator comprising in combination an element responsive to variations in pressure to thereby establish electrical variations; a source of high frequency current; means for impressing said electrical variations on said high frequency current; means for rectifying said high frequency currents; a cathode ray oscillograph including pairs of deflecting means; means for impressing said rectified currents on one of said pairs of deflecting means; means comprising a potentiometer and a source of direct current for deriving a synchronous biasing voltage as a function related to said variation in pressure; and means for applying said synchronous biasing voltage to the other pair of said deflecting means.

4. A pressure indicator comprising in combination an element responsive to variations in pressure to thereby establish electrical variations; a source of high frequency current; means for impressing said electrical variations on said high frequency current; means for rectifying said high frequency currents; a cathode ray oscillograph including pairs of deflecting means; means for impressing said rectified currents on one of said pairs of deflecting means; means comprising a source of electric current and means for varying the potential of said source as a function of said pressure variation to thereby obtain a synchronous biasing voltage; and means for applying said synchronous biasing voltage to the other pair of said deflecting means.

5. A pressure indicator comprising in combination an element responsive to variations in pressure to thereby establish electrical variations; a source of high frequency current; means for impressing said electrical variations on said high frequency current; means for rectifying said high frequency currents; a cathode ray oscillograph including pairs of deflecting means; means for impressing said rectified currents on one of said pairs of deflecting means; means comprising a source of electrical current, a potentiometer connected to said source of electrical current and means connected to said potentiometer and said pressure varying device whereby the potential of said electrical current source is synchronously varied as a function of said pressure varying device; and means for impressing said synchronous variations of potential on the other pair of said deflecting means.

6. A pressure indicator for visually indicating variations in pressure within the cylinder of an internal combustion engine comprising, means for converting said variations in pressure to variations in capacity, means for generating a high frequency current, means for modulating said high frequency current by said capacity means, means for amplifying said modulated current, means for rectifying said modulated current, means for filtering said rectified current, means for deflecting a light indicating beam by said rectified current and means to further deflect said beam in accordance with a function related to said variation in pressure.

7. A pressure indicator for visually indicating variations in pressure within the cylinder of an internal combustion engine comprising, means for converting said variations in pressure to variations in capacity, means for generating a high frequency current, means for modulating said high frequency current by said capacity means, means for rectifying said modulated current, means for deflecting a light indicating beam by said rectified current and means to further deflect said beam in accordance with a function related to said variation in pressure.

NATHAN JANCO.